United States Patent
Zaharris et al.

(10) Patent No.: US 8,001,391 B2
(45) Date of Patent: Aug. 16, 2011

(54) METHOD OF ENCRYPTING AND DECRYPTING DATA STORED ON A STORAGE DEVICE USING AN EMBEDDED ENCRYPTION/DECRYPTION MEANS

(75) Inventors: Daniel R. Zaharris, Longmont, CO (US); Lane W. Lee, Longmont, CO (US)

(73) Assignee: DPHI, Inc., Longmont, CO (US)

( * ) Notice: Subject to any disclaimer, the term of this patent is extended or adjusted under 35 U.S.C. 154(b) by 229 days.

(21) Appl. No.: 12/105,101

(22) Filed: Apr. 17, 2008

(65) Prior Publication Data
US 2009/0034722 A1    Feb. 5, 2009

Related U.S. Application Data

(63) Continuation of application No. 09/583,452, filed on May 30, 2000, now abandoned.

(51) Int. Cl.
*H04L 9/08* (2006.01)
*G06F 21/00* (2006.01)

(52) U.S. Cl. .......... 713/193; 713/165; 380/201
(58) Field of Classification Search ........... 713/165, 713/167, 189, 193; 380/44, 201, 281; 726/6, 726/26, 27, 30, 31; 705/51, 57
See application file for complete search history.

(56) References Cited

U.S. PATENT DOCUMENTS

| | | | |
|---|---|---|---|
| 6,438,235 B2 * | 8/2002 | Sims, III | 380/285 |
| 6,477,649 B2 * | 11/2002 | Kambayashi et al. | 726/27 |
| 6,631,359 B1 * | 10/2003 | Braitberg et al. | 705/50 |
| 6,636,966 B1 * | 10/2003 | Lee et al. | 713/165 |
| 6,832,319 B1 * | 12/2004 | Bell et al. | 713/193 |

\* cited by examiner

*Primary Examiner* — Gilberto Barron, Jr.
*Assistant Examiner* — Abdulhakim Nobahar
(74) *Attorney, Agent, or Firm* — Haynes & Boone, LLP.

(57) ABSTRACT

A method of encrypting data is provided that uses a medium key retrieved from a storage medium. The medium key is combined with another key to generate a combination key. Content is encrypted according to the combination key and written to the storage medium.

6 Claims, 5 Drawing Sheets

METHOD OF ENCRYPTING AND DECRYPTING DATA STORED ON A STORAGE DEVICE USING AN EMBEDDED ENCRYPTION/DECRYPTION MEANS

RELATED APPLICATIONS

This application is a continuation of U.S. patent application Ser. No. 09/583,452, filed May 30, 2000 now abandoned. In addition, this application is related to U.S. Pat. No. 6,636,966, filed Apr. 3, 2000, entitled "DIGITAL RIGHTS MANAGEMENT WITHIN AN EMBEDDED STORAGE DEVICE" which is assigned to the assignee of this application and is incorporated herein in its entirety by this reference.

TECHNICAL FIELD

The present invention relates generally to methods of encryption decryption and more specifically to a method and apparatus for encrypting data using an encryption/decryption engine that is embedded in a device for reading the data.

DESCRIPTION OF RELATED ART

In order to prevent copying or unauthorized use of data, data stored on storage devices, such as CDs, may be encrypted. In order to decrypt the data, a key or password must be provided. Typically, a key or password is a multibit binary number that, when read into logic circuitry, produces an output which enables encryption circuitry to decrypt data. Some types of encryption circuitry require multiple keys to decrypt data. Several schemes have developed for maintaining such keys and passwords.

In some systems the user must provide a code such as a password or a decryption key in order to access the data stored on the medium. This approach, though it may assist in certain schemes for avoiding unauthorized copying, typically has other associated disadvantages. The user must provide the key or password each time the user accesses the data stored on the medium. If the key or password is only provided once and then stored by the reading device or host computer to relieve the user from having to provide the key each time the user accesses the data stored on the storage medium, the key for decrypting the protected content becomes coupled to a particular host computer or media reader, such that it is cumbersome or impossible to use the medium in more than one machine. In order to use the medium in a different machine, the user must remember, then enter, the password or decryption key in the second machine when the medium is provided to the second machine. If the key is lost, the user is limited to using the first machine with the stored key to access the data stored on the storage medium. In such approaches, there is no provision for the medium itself to provide, to a computer or reader, information to decrypt the data stored on the medium. If the host device does not store the key, if the user misplaces or forgets the key, the data stored on the storage medium is lost.

Schemes where the password or the decryption key is stored on the player device or host computer also do not offer adequate protection. A user may be able to obtain the password or decryption key or defeat the protection procedure by analyzing or modifying the player or host computer. Once the password or decryption key is discovered, the user can gain access to any storage medium used in the player or the host computer.

SUMMARY

A method of encrypting data is provided that uses a medium key retrieved from a storage medium. The medium key is combined with another key to generate a combination key. Content is encrypted according to the combination key and written to the storage medium.

A method of decrypting data stored on a storage medium and encrypted using multiple keys provides a high level of security by combining internal keys generated by the data storage engine reading the data with medium keys stored on the storage medium. Internal keys are keys that are generated by hardware or software within the data storage engine. Medium keys are keys that are stored on a storage medium and retrieved from the storage medium when the storage medium is placed in the data storage engine. The medium keys stored on the storage medium may be encrypted. Encrypted medium keys are decrypted using internal keys. The internal keys are combined with the medium keys to generate combination keys. The combination keys are used to decrypt the data stored on the storage medium. In one embodiment, the encryption and decryption operations use the Data Encryption Standard (DES) algorithm, described in Federal Information Processing Standard Publication (FIPS PUB) 46-3, entitled "Data Encryption Standard," incorporated herein by this reference in its entirety.

In one embodiment, a host device for reading the storage medium includes an embedded encryption/decryption engine housed on an application specific integrated circuit (ASIC). In a decryption operation, one or more decryption keys and a block of data to be decrypted are input to the encryption/decryption engine, and decrypted data are output from the encryption/decryption engine. The host device also includes a pseudo random number generator, such as a logical feedback shift register, for generating internal keys. The pseudo random number generator is seeded in such a way that every device with the encryption/decryption engine will generate the same internal keys. In one embodiment, the seed number to the pseudo random number generator is stored flash memory external to the ASIC after the ASIC is manufactured to prevent a user or ASIC manufacturer from determining the seed to the pseudo random number generator by reverse engineering the ASIC.

The internal keys are used to decrypt a region on the storage medium known as the disk system area. The disk system area includes a master media key. The master media key is the same for a given run of mastered media. The master media key is used to generate one or more medium keys. The medium keys are then combined with the internal keys to generate combination keys to decrypt data stored on the storage medium. In one embodiment, the storage medium includes a mastered system area containing premastered data and a writable system area containing data saved by the user.

The medium keys include a mastered system area key, a writable system area key, and a file system information key. The medium keys are combined with internal keys in an exclusive "OR" logic operation (XOR) to form the combination keys. The mastered system area key is XOR'd with an internal key to form a mastered system area exclusive OR (MSA XOR) key. The MSA XOR key and an internal key are used to decrypt the data stored on a mastered file system area on the storage medium. The writable system area key is XOR'd with an internal key to form a writable system area exclusive OR (WSA XOR) key. The WSA XOR key and an internal key are used to decrypt selected data stored on a writable file system area on the storage medium. Newly selected information stored on a writable area are encrypted using the WSA XOR key. In some embodiments, the decryption operations are triple DES with two keys.

The file system information key is XOR'd with one of the internal keys to form a new file system information exclusive OR (FSI XOR) key. In one embodiment, file pointers stored in the mastered file system area are double encrypted, such that when the mastered file system area is decrypted by the MSA XOR key, the file pointers remain encrypted. The FSI XOR key and an internal key are used to decrypt file pointers that connect a directory structure stored in the disk system area and mastered file system area with data stored on the other regions of the storage medium. In one embodiment, these file pointers are decrypted and stored within the ASIC. The file pointers are never exposed to a data bus or data buffer outside the ASIC. Storing the file pointers within the ASIC affords an extra level of security.

DETAILED DESCRIPTION

Figure 1:
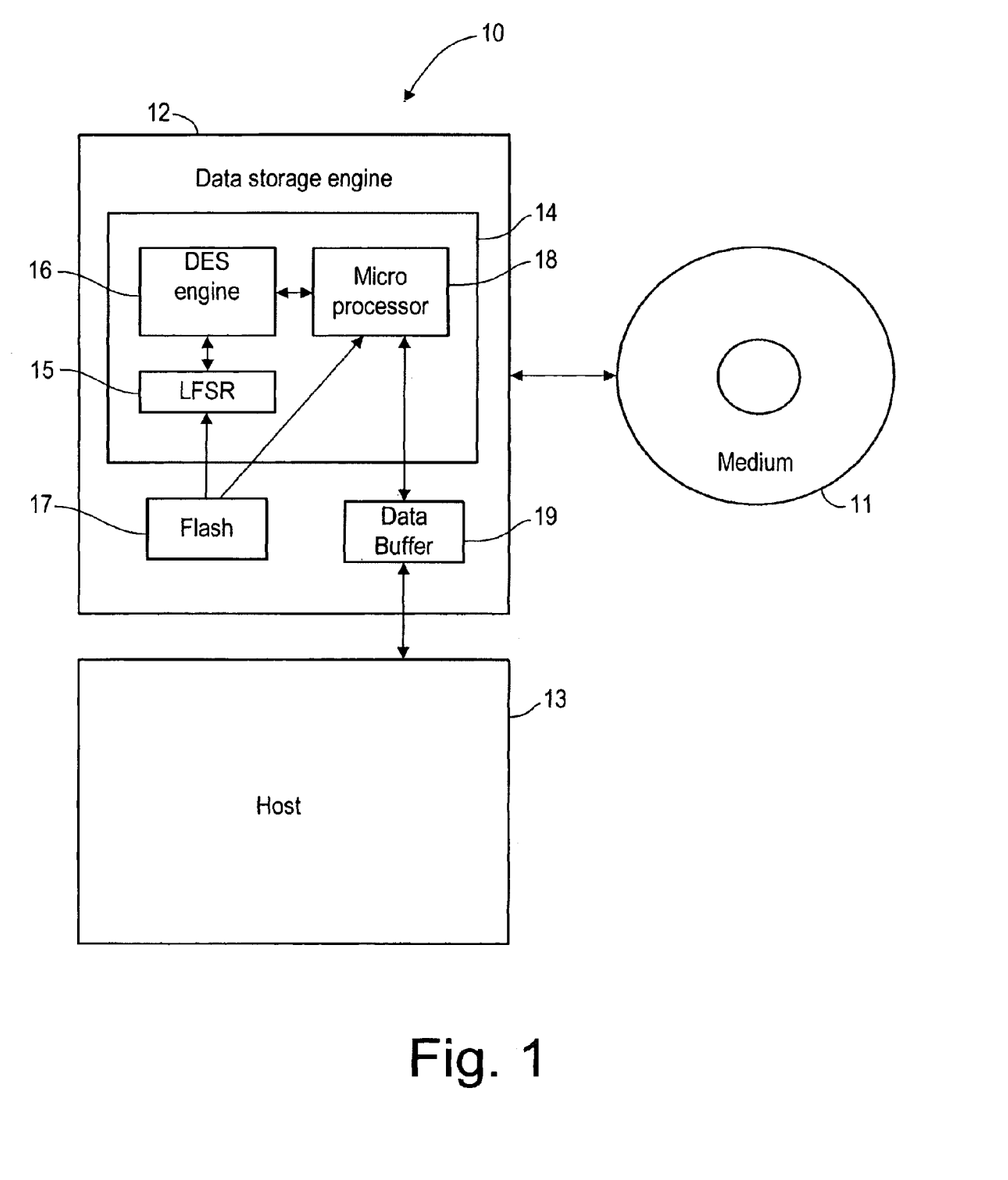
FIG. 1 illustrates a storage medium and a media player for retrieving data stored on the storage medium.

FIG. 1 illustrates a media player 10 for retrieving the data stored on medium 11. Media player 10 includes a host 13 and a data storage engine 12. Data storage engine 12 can read data stored on storage medium 11 and write data to storage medium 11. Data storage engine 12 may be connected to host 13, or may be integrated into host 13. For example, host 13 may be a personal computer, and data storage engine 12 may be externally connected to the personal computer. Or, host 13 may be a personal player similar to a CD player. In such an embodiment, data storage engine 12 is integrated into the personal player.

Data storage engine 12 reads encrypted data from medium 11, decrypts the data, then sends the decrypted data to host 13 through data buffer 19. For example, if medium 11 stores music, the data storage engine retrieves the encrypted music from medium 11, decrypts the music, then sends the decrypted music to host 13. The host may be, for example, a player that includes speakers. The host then conveys the data to the user.

Data storage engine 12 includes an application specific integrated circuit (ASIC) 14. The ASIC includes an encryption/decryption engine 16. For simplicity, encryption/decryption engine 16 is referred to as a DES engine encrypting and decrypting data using the Data Encryption Standard (DES), though any encryption/decryption algorithm may be used. Several modes of DES encryption and decryption are available. These modes are described in FIPS PUB 81, entitled "DES Modes of Operation," and incorporated herein in its entirety by this reference. In one embodiment, DES engine 16 supports several modes: single DES in ECB and CBC mode and triple DES in ECB and CBC mode. Single DES requires a single key to encrypt and decrypt and triple DES requires two or three keys to encrypt and decrypt. In some embodiments DES engine 16 decrypts using triple DES with two or three keys. In some embodiments DES engine 16 includes two DES cores, one for performing triple DES decryption and one for performing single DES encryption. In such an embodiment, information read from medium 11 can be decrypted by the triple DES decryption core, then immediately reencrypted by the single DES encryption core using a different key. One embodiment of DES engine 16 is available from Intronic Semiconductor of Ottawa, Canada. DES engine 16 is connected to a microprocessor 18 for performing encryption and decryption operations.

ASIC 14 also includes a logical feedback shift register (LFSR) 15, available from Intronic Semiconductor of Ottawa, Canada. LFSR 15 is a pseudo-random number generator which is used to generate numbers that are used as decryption keys. ASIC 14 communicates with host 13 through a data buffer 19. To use the host, a user loads medium 11 into data storage engine 12. The user then requests that the host retrieve data stored on medium 11. Data storage engine 12 retrieves the requested data from medium 11 decrypts the data in DES engine 16. The data is transferred to data buffer 19, then transferred to host 13 for presentation to the user.

Figure 2:
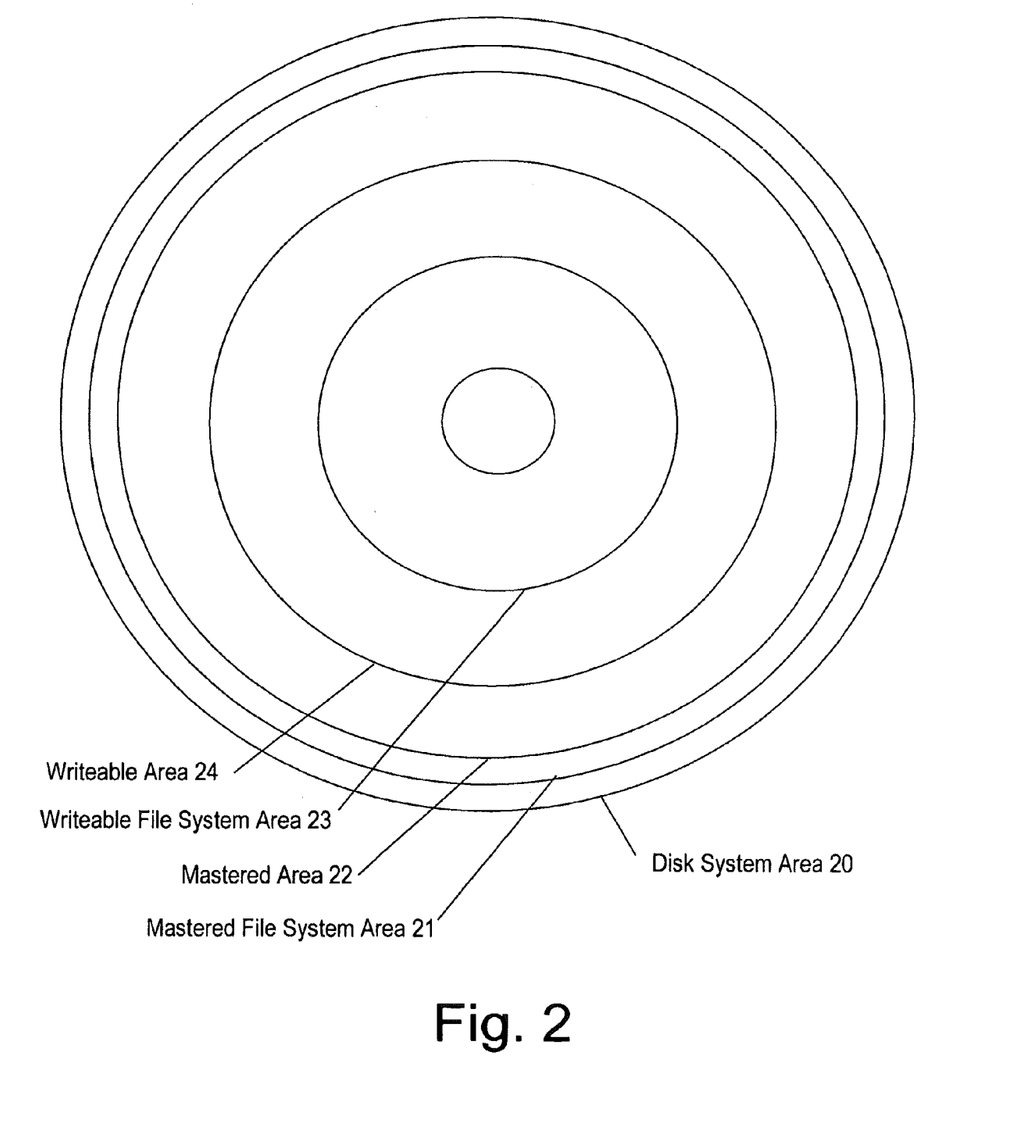
FIG. 2 illustrates the storage medium of FIG. 1.

FIG. 2 illustrates one embodiment of storage medium 11 of FIG. 1. An example of storage medium 11 is described in U.S. patent application Ser. No. 09/583,448 filed on the same day as this application, entitled "FORMAT FOR RECORDING DATA ON A STORAGE DISK," assigned to the assignee of this application, and incorporated herein in its entirety by this reference. Storage medium 11 includes at least three areas, a disk system area 20, a mastered file system area 21, and a mastered system area 22. Disk system area 20 includes information such as storage device format characteristics and layout information of storage medium 11. Disk system area 20 also includes a master media key which is used with other keys to decrypt the information stored on the medium.

Storage medium 11 also includes a mastered file system area 21 and a mastered area 22. Mastered file system area 21 stores file system information related to the mastered data stored in mastered area 22. Mastered file system area 21 may store, for example, directory information, file attributes, file size, and other file system information. Mastered area 22 stores the actual data that is of interest to the user. The data stored in mastered area 22 may be, for example, music, video, text, or any other kind of data. The data stored in disk system area 20, mastered file system area 21, and mastered area 22 are provided on storage medium 11 when the storage medium is manufactured.

Storage medium 11 may also include a writable file system area 23 and a writable area 24. Writable area 24 stores data provided by the user. For example, if mastered area 22 includes text, writable area 24 may include notations made by the user to the text. Writable file system area 23 includes file system information for the files stored in writable area 24. In one embodiment, storage medium 11 has only disk system area 20, mastered file system area 21, and mastered area 22.

The data stored in disk system area 20, mastered file system area 21, and mastered area 22 are encrypted. In one embodiment, the data in disk system area 20, mastered file system area 21, and mastered area 22 are encrypted during the mastering process using triple DES. The data in writable file system area 23 and writable area 24 may also be encrypted. The data in areas 23 and 24 are encrypted by encryption/decryption engine 16 of data storage engine 12 when stored by the user on storage medium 11. In one embodiment, the data stored in writable file system area 23 and writable area 24 are encrypted using single or triple DES.

Figure 3:
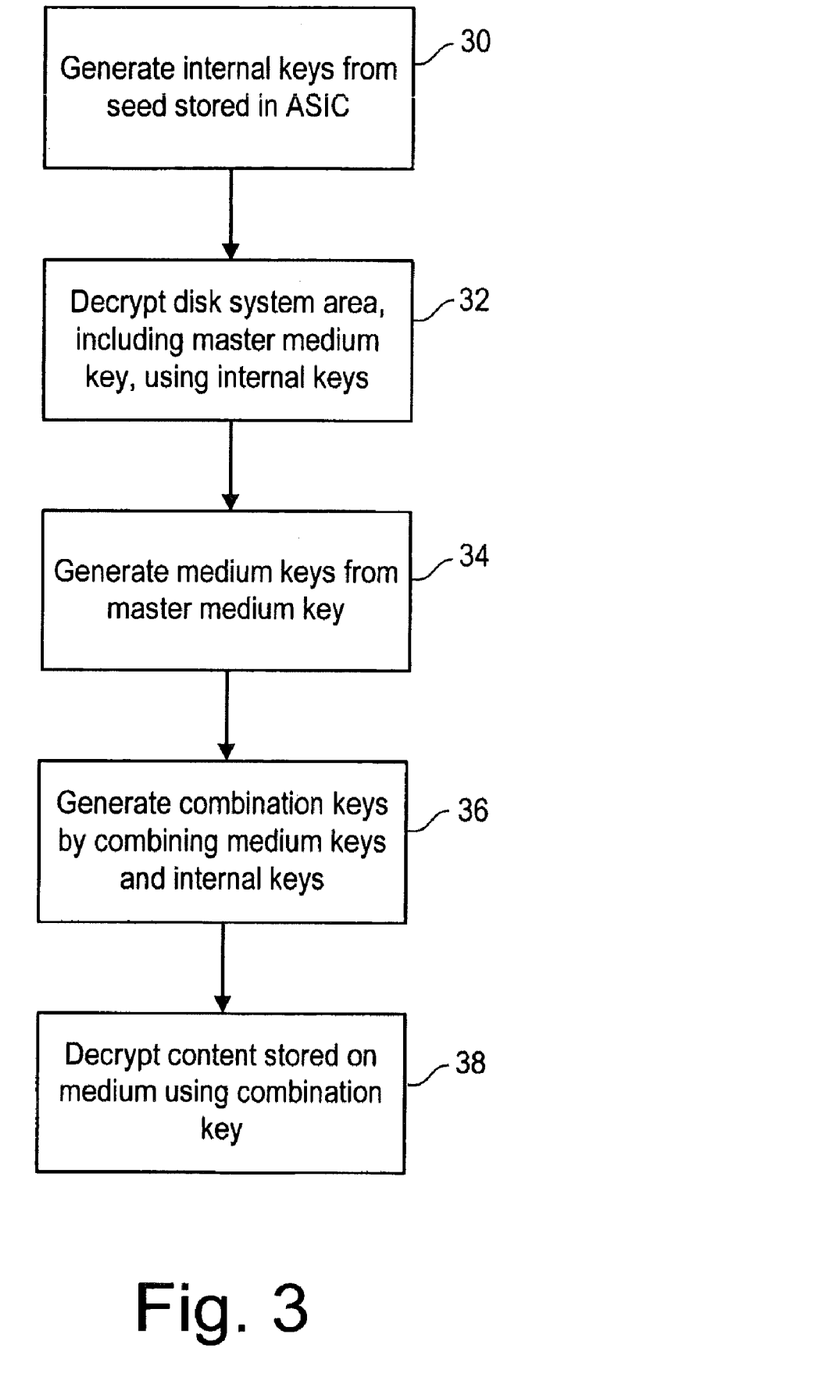
FIG. 3 illustrates, in a flowchart, a method of decrypting data stored on the storage medium of FIG. 1.

FIG. 3 illustrates a method of decrypting the data stored on storage medium 11. The method uses three types of keys: internal keys, which are generated by data storage engine 12 by a pseudo random number generator; medium keys, which are stored on storage medium 11; and combination keys, which are generated by combining internal keys and medium keys. In stage 30, one or more internal keys are generated by data storage engine 12. In one embodiment, the internal keys are generated by LFSR 15 (FIG. 1) as described below in reference to FIG. 4A. At least one of the internal keys is used to decrypt disk system area 20 on medium 11 (FIG. 2) in stage 32 of FIG. 3. A master media key is included in the disk system area. The master media key is therefore decrypted in stage 32. One or more medium keys are then generated from the master media key in stage 34. In one embodiment, the medium keys are generated by dividing the master media key into segments, as described below in reference to FIG. 4B.

In stage 36, one or more combination keys are generated by combining the medium keys with the internal keys. In one embodiment, the combination keys are generated by XORing an internal key with a medium key, as described below in reference to FIG. 4C. In stage 38, a portion of the data stored on storage medium 11 is decrypted using at least one of the combination keys.

In one embodiment, the information in mastered file system area 21 can be decrypted using one of the combination keys, but the information in mastered area 22 cannot be decrypted using the combination keys. In this embodiment, after the information stored in mastered file system area 21 describing the files in mastered area 22 is decrypted, the descriptive information is presented to the user. The user then selects portions of the information stored in mastered area 22 to enable. The user enables the information stored in mastered area 22 by retrieving a separate decryption key for decrypting the selected data in the mastered area, as described in U.S. patent application Ser. No. 09/542,510.

One of the combination keys is used to encrypt information stored by the user in writable file system area 23 and writable area 24. When a user later requests the files stored in writable area 24, they are decrypted using the same combination key.

Figure 4A:
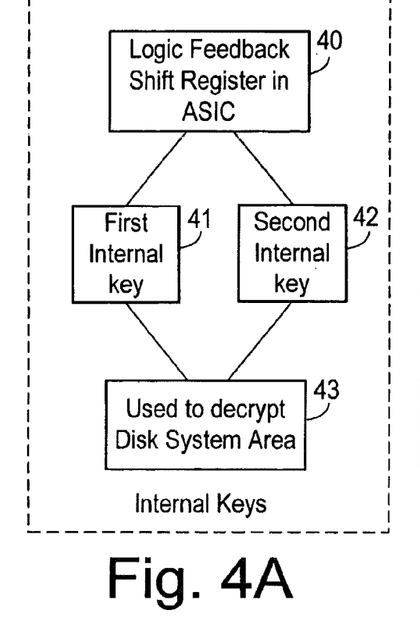
FIG. 4A illustrates the internal keys of FIG. 3.
Figure 4B:
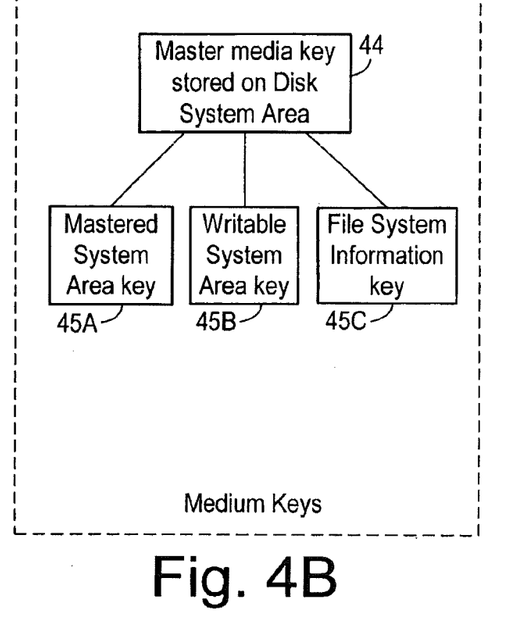
FIG. 4B illustrates the medium keys of FIG. 3.
Figure 4C:
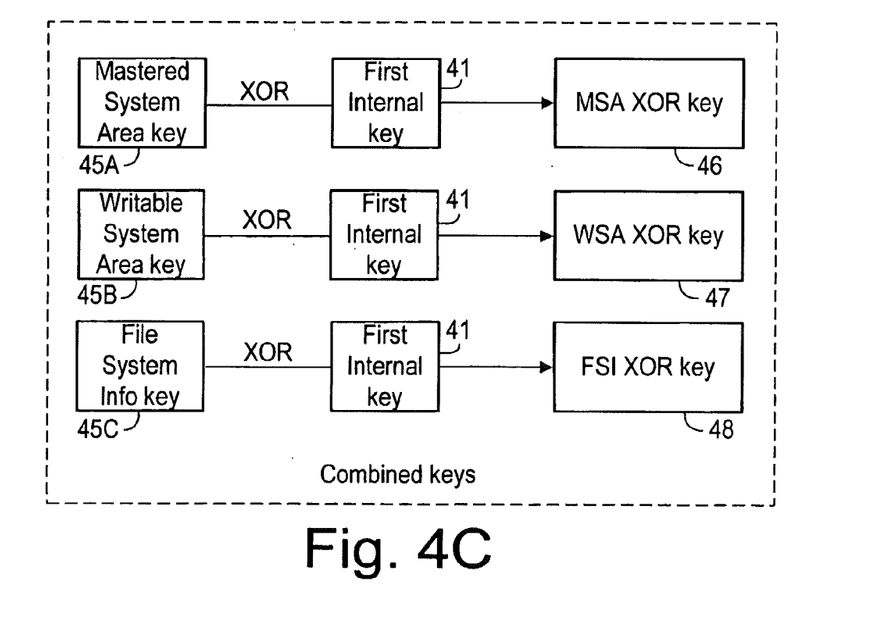
FIG. 4C illustrates the combination keys of FIG. 3, generated from combinations of the internally generated keys and the medium keys.

FIG. 4A-4C illustrate the keys generated to decrypt the data stored on a storage medium 11 according to one embodiment of the present invention. FIG. 4A illustrates the internal keys, the keys generated by ASIC 14 of FIG. 1. LFSR 15 generates two random number keys, first internal key 41 and second internal key 42. LFSR 15 is a mechanism for generating a sequence of binary bits. A first sequence of bits output from the LFSR are first internal key 41 and a second sequence of bits output from LFSR 15 are second internal key 42. LFSR 15 includes a series of cells that are set by inputting an initialization value or "seed" number containing as many bits as there are cells. In each clock cycle, the contents of the cells are shifted right by one position. The data input in the leftmost cell is the result of a logic operation, often an XOR, performed on a subset of cells in the LFSR. The subset of cells whose contents are used in the logic operation are dictated by feedback logic in the LFSR 15, which is selected when the ASIC 14 is manufactured. The output of LFSR 15 is the same for a given seed number and a given set of feedback logic. First internal key 41 and second internal key 42 can therefore be the same for every data storage engine 12.

In one embodiment, the seed provided to LFSR 15 (FIG. 1) is contained in firmware stored in flash memory 17 external to ASIC 14. The seed is not part of the design of ASIC 14, rather it is stored outside the ASIC after the ASIC has been fabricated. Thus, while the particular feedback logic of LFSR 15 may be discovered by reverse engineering ASIC 14, the seed to LFSR cannot be discovered by reverse engineering ASIC 14. Accordingly, one who reverse engineers ASIC 14 is unable to generate first internal key 41 and second internal key 42. Further, ASIC 14 can be manufactured separately from data storage engine 12 without the risk of an ASIC manufacturer discovering the value of the seed to LFSR 15. Only the manufacturer of data storage engine 12, who stores in flash memory 17 external to ASIC 14 the firmware containing the seed to LFSR 15 in ASIC 14, knows the seed value. The seed to LFSR 15 may be generated by another LFSR. In some embodiments, multiple LFSRs connected in series or parallel generate a seed to LFSR 15.

First internal key 41 and second internal key 42 are then used to decrypt disk system area 20 (FIG. 2), using triple DES with two keys. First internal key 41 and second internal key 42 are generated by LFSR 15, then used by DES engine 16 to decrypt the disk system area 20. Thus, the first and second internal keys never leave ASIC 14. ASIC 14 and data buffer 19 may be encased in protective epoxy which covers the ASIC. Such epoxy protects the ASIC by making it nearly impossible to probe the ASIC to determine the signals inside the ASIC, and therefore the internal keys, because any such probing destroys the ASIC.

Once disk system area 20 is decrypted, the master media key can be retrieved from disk system area 20 (block 44 in FIG. 4B). Master media key 44 is the same for a given run of mastered media. For example, every storage medium storing a particular set of data will have the same master media key. Master media key 44 is then used to generate mastered system area key 45A, writable system area key 45B, and file system information key 45C. In one embodiment, master media key 44 is a 256-bit number and mastered system area key 45A, writable system area key 45B, and file system information key 45C are subsets of master media key 44. The breaking of the master media key into subsets to form the mastered system area key, the writable system area key, and the file system information key is an operation that is programmed into firmware stored in flash memory 17 external to ASIC 14.

FIG. 4C illustrates the combined keys. The combined keys are created by combining the medium keys with the internal keys in an exclusive OR (XOR) operation. Each bit in the medium key is XOR'd with the corresponding bit from an internal key. Thus, in one embodiment where the medium keys and internal keys are 56 bit numbers, the combined key input to DES engine 16 of FIG. 1 is the output from 56 XOR gates. Mastered system area key 45A is XOR'd with first internal key 41 to form mastered system area exclusive OR (MSA XOR) key 46. Writable system area key 45B is XOR'd with first internal key 41 to form writable system area exclusive OR (WSA XOR) key 47. File system information key 45C is XOR'd with first internal key 41 to form file system information exclusive OR (FSI XOR) key 48.

For clarity, the names of the medium keys are spelled out and the names of the combination keys are abbreviated. Thus, the medium keys are referred to as the mastered system area key, the writable system area key, and the file system information key. The combination keys are referred to as the MSA XOR key, the WSA XOR key, and the FSI XOR key.

Internal keys 41 and 42 are generated by hardware in ASIC 14, e.g. LFSR 15. Medium keys 45A, 45B, and 45C and combined keys 46-48 are generated by firmware operations stored in ASIC 14.

Figure 5:
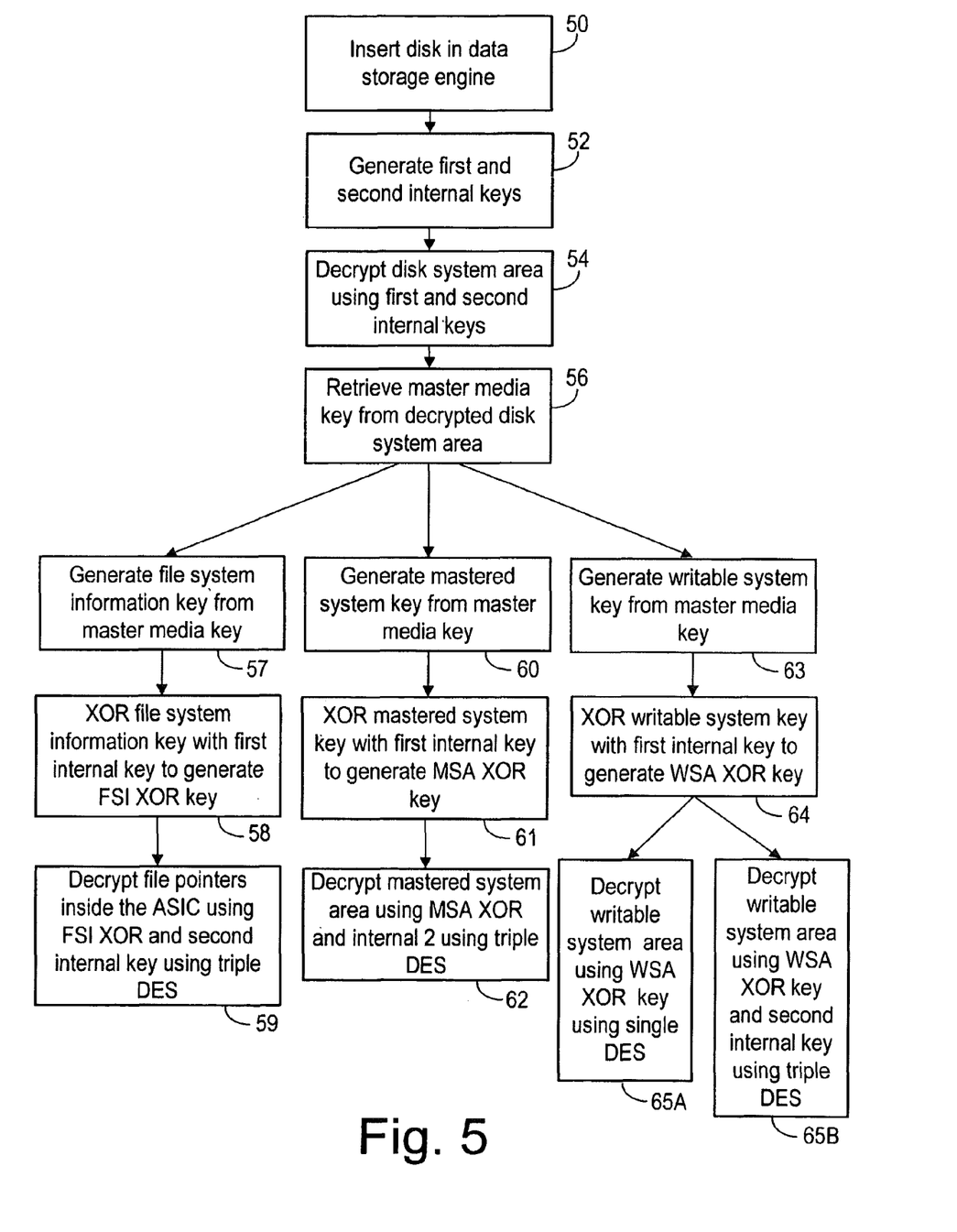
FIG. 5 illustrates, in a flowchart, one embodiment of the method of decrypting data of FIG. 3.

FIG. 5 illustrates a method of decrypting data stored on storage medium 11 using the keys generated in FIG. 4A-4C. In stage 50, the storage medium is inserted into a data storage engine. ASIC 14 seeds LFSR 15 to form the first and second internal keys of FIG. 4A. The two internal keys are then used to decrypt the data stored in disk system area 20 of FIG. 2, shown in stage 54 of FIG. 5. Once disk system area 20 is decrypted, the master media key is retrieved in stage 56. The master media key is then used to generate the file system information key in stage 57. The user then requests some data from the storage medium. Depending on the data requested by the user, the mastered system area key and/or the writable system area key are generated from the master media key, shown in stages 60 and 63.

In some embodiments, some critical data stored in the disk system area, the mastered file system area, or the writable file system area, are double-encrypted. Such critical data may include file pointers between a directory or file system structure stored in any of these areas and the data stored in the mastered area and/or the writable area. Thus, when the information stored in the disk system area, mastered file system area, or writable system area are decrypted, these file pointers remain encrypted. The file pointers may be double encrypted to provide an extra level of security to the data stored on the storage medium. Once the data stored in the disk system area, the mastered system area, and the writable system area are decrypted and sent to data buffer 15 (FIG. 1), they become more vulnerable to "snooping" than when inside the ASIC, because the data buffer, even if protected by epoxy, is more vulnerable to probing than the protected ASIC. If a user is able to probe the data buffer, the user may be able to transfer the data from storage medium 11 to another medium. Once the data is stored on another medium in an unencrypted form, the data can be duplicated and distributed, thus defeating the encryption scheme. However, if the file pointers connecting the data to the file system structure defining the data are still encrypted, unencrypted data taken from the data buffer may be difficult or impossible to decipher. Thus, the unencrypted file pointers are never exposed to a data buffer outside ASIC 14.

When the user requests a particular file, the encrypted file pointer is retrieved from the data buffer, sent to microprocessor 18 (FIG. 1), and decrypted by DES engine 16. In stage 58, the file system information key generated from the master media key is XOR'd with the first internal key to generate the FSI XOR key. In stage 59, the FSI XOR key and the second internal key are then input to DES engine 16 to decrypt the file pointers within the DES engine using triple DES with two keys. Using the file pointer, the file requested by the user is sent to data buffer 19 to be retrieved by the host. The unencrypted file pointer is stored only in memory inside the ASIC, and therefore never leaves ASIC 14. The unencrypted file pointer is therefore less vulnerable to unauthorized use than data stored on the data buffer.

In stage 61 of FIG. 5, the mastered system area key generated from the master media key is XOR'd with the first internal key generated by the ASIC to form a MSA XOR key. The mastered file system area and/or the mastered area can then be decrypted in stage 62 using two key triple DES with the MSA XOR key and the second internal key as the two keys. Similarly, in stage 64, the writable system area key generated from the master media key is XOR'd with first internal key generated by the ASIC to form a WSA XOR key. The writable file system area and/or the writable area can then be decrypted in stage 65B using two key triple DES with the WSA XOR key and the second internal key as the two keys. In another embodiment, the writable system area is decrypted in stage 65A using the WSA XOR key as the key to single DES decryption. In addition, when the user requests that data be saved to the writable system area, the data is encrypted with single DES using the WSA XOR key before it is written to the writable system area. Though the WSA XOR key may be used to encrypt and decrypt unmastered, user-generated data, the WSA XOR key itself is generated from the master media key, which is mastered.

The keys shown in FIG. 4A are generated in stage 52 of FIG. 5. The keys shown in FIG. 4B are generated in stages 54, 56, 57, 60 and 63 of FIG. 5. The keys shown in FIG. 4C are generated in stages 58, 61, and 64 of FIG. 5.

Since every data storage engine has the same firmware seed to LFSR 15, every data storage engine will generate the same first internal key 41 and second internal key 42 (FIG. 4A). Thus, any data storage engine is able to decrypt and read the data stored in disk system area 20 of storage medium 11. However, any engine or host that is not able to generate first internal key 41 and second internal key 42 cannot decrypt disk system area 20. Such a device will not be able to retrieve any data from storage medium 11 even if the master media key is known, because disk system area 20 stores an encrypted directory structure for the data stored in mastered system area 22 and writable system area 24. If the directory structure is not known, the data stored in the mastered system area and writable system area are difficult to access because the user cannot know where one file ends and another begins. In addition, the mastered file system area and the writable file system area are decrypted using keys generated by combining keys generated form the master media key with keys generated by the data storage engine. Thus, knowing the master media key without the internal keys or the internal keys without the master media key does not allow a user to access the data stored on the storage medium. Further, even if the master media key is known, the mastered system area key, the writable system area key, and the file system information key are not known.

The data stored in the mastered area may be further encrypted during the mastering process. Thus, once stages 60-62 of FIG. 5 are completed, the data stored in the mastered system area may need to be further decrypted using the DES engine, according to a process specified by the producer of the mastered data.

Various modifications and adaptations of the embodiments and implementations described herein are encompassed by the attached claims. For example, any encryption or decryption algorithm may be used, not just DES. Also, any of the decryption or encryption operations may be single DES in any DES mode, triple DES with two keys in any DES mode, or triple DES with three keys In any DES mode. In addition, new keys may be generated from the internal and medium keys using any combination operation, not just XOR as described herein. Finally, the combined keys are not limited to the combinations of internal keys and medium keys described herein.

We claim:

1. A method of decrypting data stored on a storage medium using an encryption/decryption core embedded within an integrated circuit in a data storage engine, the storage medium including a first key, comprising:

generating a pseudo-random number within the integrated circuit using a seed stored within a non-volatile memory external to the integrated circuit to form an internal key, wherein the internal key is not transmitted outside of the integrated circuit;

decrypting an encrypted first key stored on the storage medium using the internal key;

within the integrated circuit, generating a combination key based upon the decrypted first key and the internal key;

within the encryption/decryption core, decrypting an encrypted file directory stored on the storage medium;

using the decrypted file directory to locate a file stored on the storage medium; and within the encryption/decryption core, decrypting data from the file stored on the storage medium with the combination key.

2. The method of claim 1, wherein the combination key is a DES key.

3. The method of claim 1, wherein the pseudo-random number is generated using a feedback shift register.

4. The method of claim 1, wherein using the decrypted file directory to locate a file stored on the storage medium comprises decrypting a file pointer between the file directory and the file using the combination key.

5. A method of decrypting data stored on a storage medium using an encryption/decryption core embedded within an integrated circuit in a data storage engine, the storage medium including a first key, comprising:

generating a pseudo-random number within the integrated circuit using a seed stored within the integrated circuit to form an internal key, wherein the internal key is not transmitted outside of the integrated circuit;

decrypting an encrypted first key stored on the storage medium using the internal key;

within the integrated circuit, generating a combination key based upon the decrypted first key and the internal key;

within the encryption/decryption core, decrypting an encrypted file directory stored on the storage medium;

using the decrypted file directory to locate a file stored on the storage medium; and     within the encryption/decryption core, decrypting data from the file stored on the storage medium with the combination key.

6. The method of claim 5, wherein using the decrypted file directory to locate a file stored on the storage medium comprises decrypting a file pointer between the file directory and the file using the combination key.

\* \* \* \* \*